US005181312A

United States Patent [19]

Gross

[11] Patent Number: 5,181,312

[45] Date of Patent: Jan. 26, 1993

[54] METHOD AND APPARATUS FOR FIXING HEATING RESISTORS TO A SUPPORT

[75] Inventor: Martin Gross, Kaempfelbach, Fed. Rep. of Germany

[73] Assignee: E.G.O. Elektro-Gerate Blanc u. Fischer, Fed. Rep. of Germany

[21] Appl. No.: 708,187

[22] Filed: May 31, 1991

[30] Foreign Application Priority Data

Jun. 22, 1990 [DE] Fed. Rep. of Germany .... 4019898.7

[51] Int. Cl.[5] .......................... H05B 3/00; B23P 19/00

[52] U.S. Cl. .......................................... 29/611; 29/744; 29/745; 29/798

[58] Field of Search ................. 29/611, 744, 745, 798, 29/432, 432.1, 432.2; 219/463, 536, 542; 227/31, 33, 139

[56] References Cited

U.S. PATENT DOCUMENTS

| | | | |
|---|---|---|---|
| 1,765,885 | 6/1930 | Scherm, Jr. | 227/139 |
| 3,833,793 | 9/1974 | McWilliams et al. | 219/463 |
| 4,706,869 | 11/1987 | Knispel et al. | 227/156 |

FOREIGN PATENT DOCUMENTS

| | | |
|---|---|---|
| 2339768 | 2/1974 | Fed. Rep. of Germany . |
| 7405550 | 2/1974 | Fed. Rep. of Germany . |
| 2806367 | 8/1978 | Fed. Rep. of Germany . |
| 3309476 | 9/1983 | Fed. Rep. of Germany . |
| 3527413 | 2/1987 | Fed. Rep. of Germany . |

*Primary Examiner*—P. W. Echols
*Attorney, Agent, or Firm*—Quarles & Brady

[57] ABSTRACT

An attaching or mounting tool (21) is used for fixing a heating coil (16) to an insulating material support (13). The heating coil (16) is inserted in slots (24) therein and are held in place by magnetic force. Resilient positioning devices (28) are provided in openings (26) in the tool (21) and into the same can be introduced the nose (36) of a clip fitting device (24), so that the heating coils can be fixed to the support (13) by means of clips.

18 Claims, 4 Drawing Sheets

FIG. 6
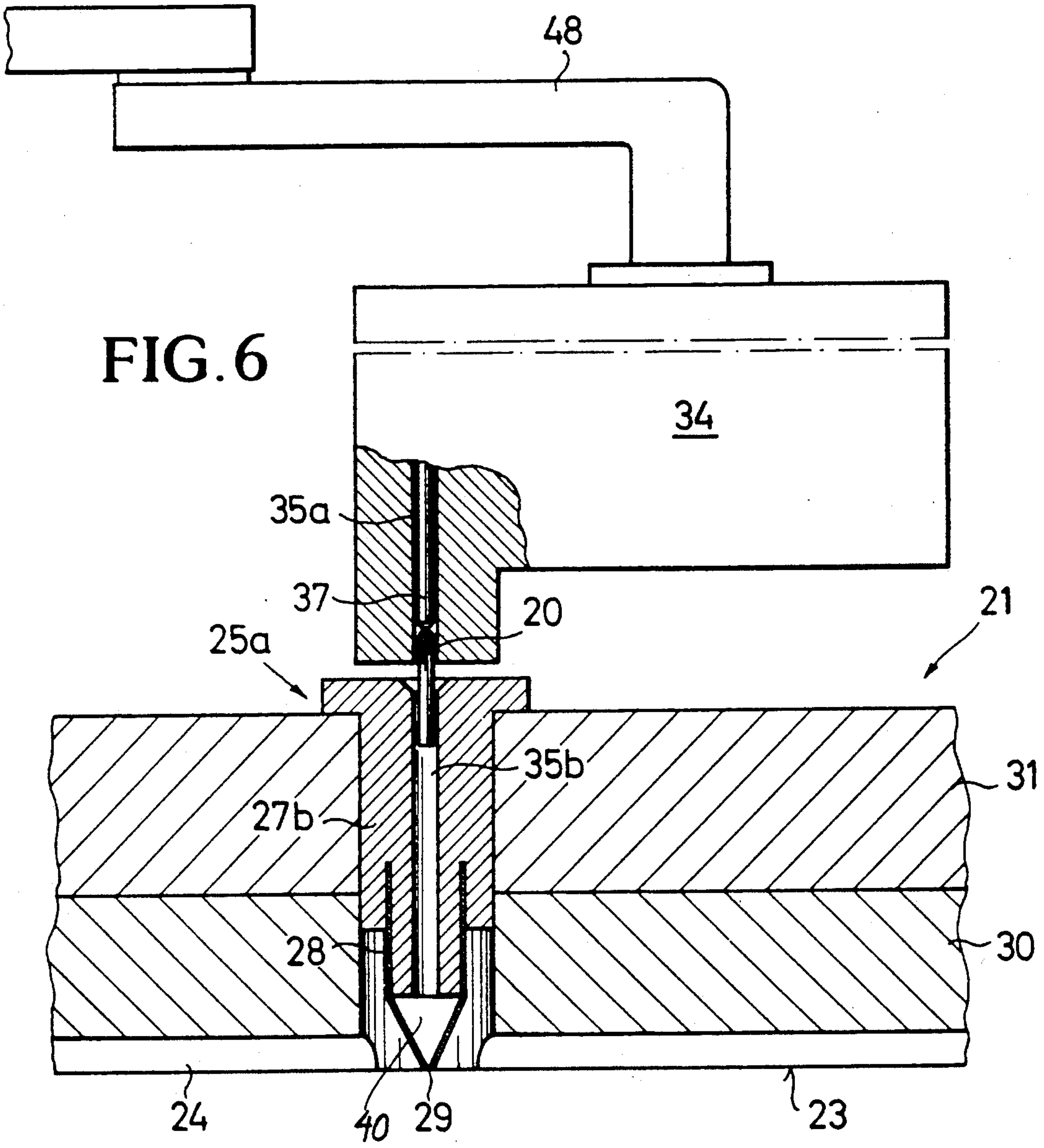
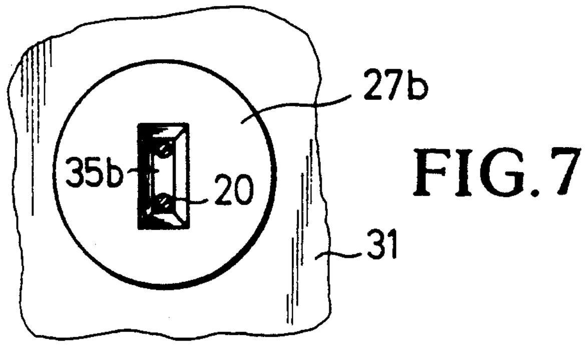
FIG. 7

METHOD AND APPARATUS FOR FIXING HEATING RESISTORS TO A SUPPORT

BACKGROUND OF THE INVENTION

DE-A-23 39 768 discloses a radiant heating element for cooking purposes, in which the helical heating resistors are fixed to the surface of an insulating material formed from a molded or compressed silicic acid-aerogel by means of U-shaped clips, which are driven into the support material. The clips are attached or mounted by means of pneumatically operated clip fitting devices, which are manually guided and operated. This is not only very time-consuming, but also requires qualified operators, who must operate with considerable care, because otherwise damage can occur to the support layer or the clips may not be driven in cleanly, so that there would be possibilities of short-circuits during the operation of the heating element.

SUMMARY OF THE INVENTION

An object of the present invention is to provide a method and an apparatus facilitating the mounting of the heating resistors by means of clips and which preferably also permits automation.

By means of the attaching or mounting tool the heating resistors can be prepositioned outside the support area in their final form or shape, e.g. a spiral configuration. The attaching tool then moved up to the support, so that the heating resistors assume their desired position thereon and then the clips can be fitted by the guidance means. This can take place in numerous different ways. The clip guidance means can be directly formed by parts of the clip fitting device, i.e. contain a guiding or firing channel for the latter. In this case the attaching tool could contain several clip fitting devices at the intended points. Since in the case of such a construction the supply of clips to so many clip positions is very complicated, it may be appropriate to move one or more clip fitting devices manually or by industrial robots to the clip guidance means, which in this case position the clip fitting device. It is also possible for the attaching tool to only contain part of the firing channel. The clip guidance means can be bores or sleeves in the attaching tool, to which it is only necessary to relatively roughly supply the fitting device nose containing the firing channel. The fitting device then either positions itself or the clips in a completely satisfactory manner.

It is then possible to provide on the attaching tool an elastic insertion aid otherwise provided on the fitting device, e.g. two spring plates compressed at the tip thereof. During insertion the helix seeks the correct position such that the tip formed by the spring plates engages between turns of the heater coil and optionally axially moves the same. Thus, the clip is always fitted between two heater coil turns via the wire portion resting on the support.

The firing channel can also be integrated into the attaching tool and the clip setting device need only be positioned above the same with its drive and the clip supply, e.g. with a shortened nose.

The heater coil guide can comprise a corresponding guide slot, in whose vicinity the heater coils are maintained, e.g. by a magnetic force. The attaching tool is constructed in such a way that on raising, the magnetic force is so reduced that it becomes weaker than the holding force of the clips, so that on raising the attaching tool the heater coils remain on the support.

By the method of the invention the heating resistor can be fitted directly and without any intermediate layer to the surface of an only slightly abrasion-resistant support molded or compressed from a pulverulent material.

BRIEF DESCRIPTION OF THE DRAWINGS

The invention is described hereinafter relative to embodiments and the attached drawings, wherein:

FIG. 6 a variant of clip guidance means.

FIG. 7 a section along line VII in FIG. 6.

DETAILED DESCRIPTION OF THE PREFERRED EMBODIMENTS

Figure 1:
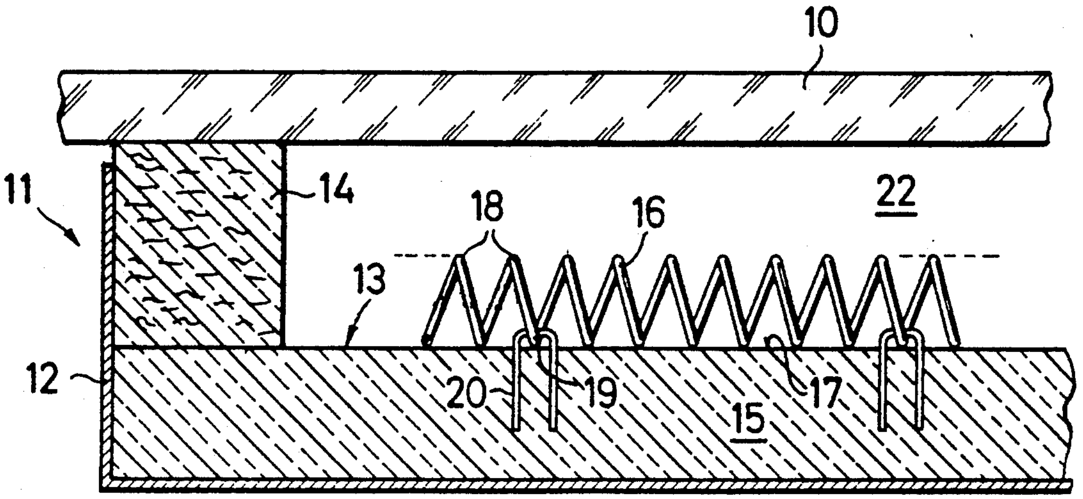
FIG. 1 a partial view of a heating element with a heating resistor fitted by means of clips.

FIG. 1 shows an electric radiant heater 11, which is positioned below a glass ceramic plate 10, e.g. for heating a cooking point. In a sheet-metal tray 12 it contains a support made from high heat-resistance insulating material, particularly a slightly compressed shaped article made from a very slightly pourable, mineral insulating material such as pyrogenic silicic acid - aerogel. This material has very good thermal insulating characteristics and a good thermal stability, but low mechanical strength characteristics and low abrasion resistance. The material is brought in the form of a bulk material into the sheet-metal tray 12 and is compressed there with a ram or is introduced as a preform or blank, where it forms a layer or planar bottom 15. A continuous peripheral edge 14 is inserted following the fitting of the coil by a separate ring of material with better mechanical strength characteristics, such as a fibrous insulating material (Fiberfrax). It is also possible to carry out the fixing of the heating resistor to a support outside the sheet-metal tray and to insert the resulting unit.

Figure 2:
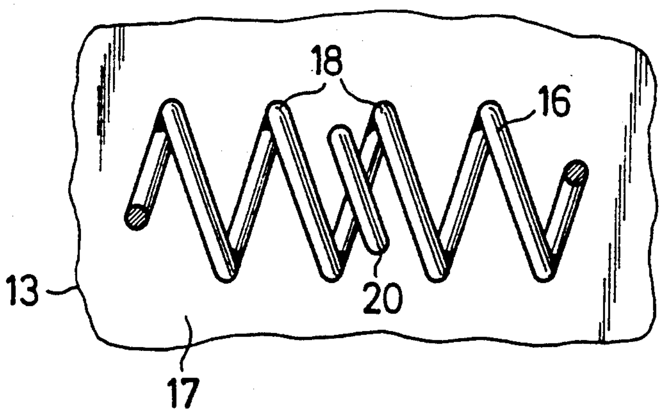
FIG. 2 a plan view of the details shown in FIG. 1.

In order to be able to fix a helical heating resistor to the surface 17 of the bottom 15 of the support 13, clips 20 are driven in at intervals between the coil turns 18, said clips being substantially U-shaped and engaging with their two free legs in the support material. FIG. 2 shows that the clips are fitted with a certain inclination, so as to engage between two turns 18. A clip arrangement passing over an upper portion of the heating resistor and substantially surrounding the entire coil is possible, but is less advantageous because it does not permit a reliable axial fixing and has a greater self-heating.

The heating coils can be arranged in the conventional spiral manner or in some other configuration on the surface 17 and are preferably located in groove-like depressions. The arrangement on the surface and fixing by clips alone are also possible. One or more heating resistors per radiant heater are possible.

Figure 3:
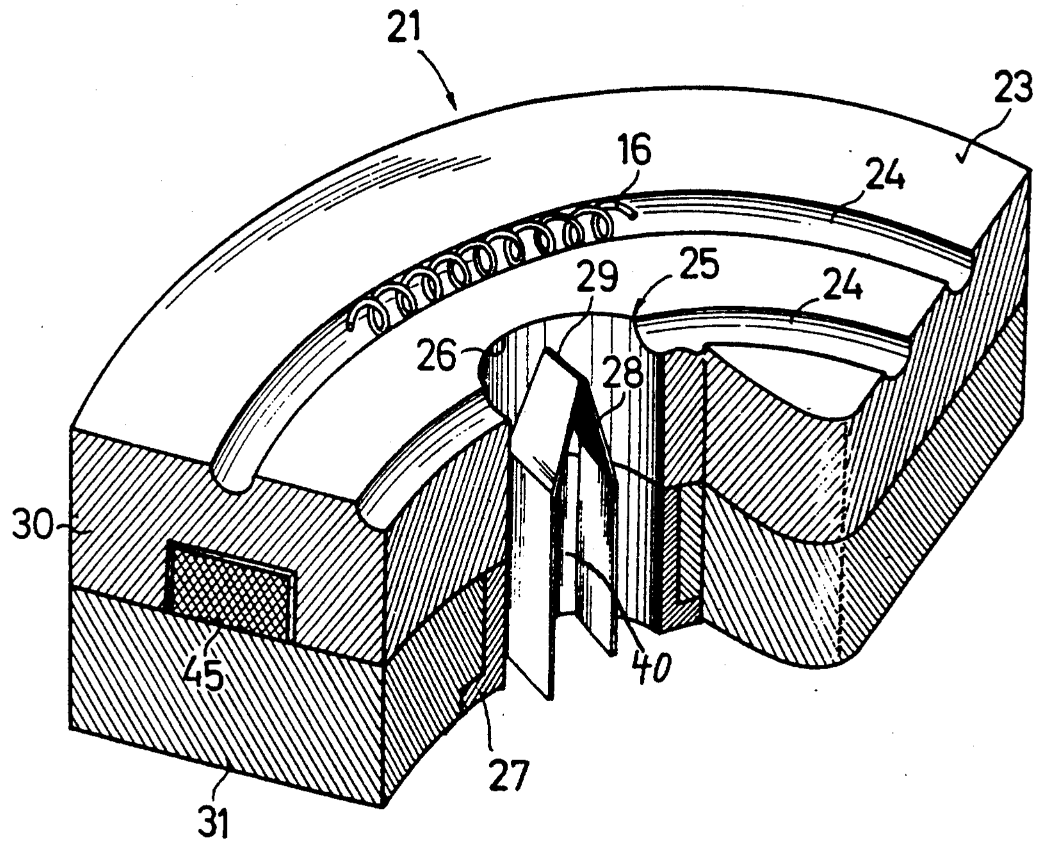
FIG. 3 a perspective, sectional partial view of an attaching tool.

FIG. 3 shows a mounting or attaching tool 21, which has the basic shape of a disk and which fits into the inner space 22 (see FIG. 1) formed within the sheet-metal tray 12 of the radiant heater. On its upper, substantially planar working surface 23 in FIG. 3 it has guidance means 24 in the form of slots or grooves, which are constructed according with the desired spiral configuration of the heating resistors 16 and receive the latter therein.

The attaching tool is built up from a disk 30 of non-ferromagnetic material, e.g. red brass, and a disk 31 of ferromagnetic material.

For securing the heating resistors, which are usually made from a ferromagnetic material, magnets 45 extending into depressions of the disk 30 are provided below the guidance means or slots 24 on the disk 31 and keep the heating elements 16 in the slots with a predetermined force adequate to maintain the heating resistors in the slot in an overhead position. However, here again other fixing methods are possible, e.g. a slight lateral jamming in the slot or the like.

In the vicinity of the guidance means 24 spaced clip guidance means 25 are provided, which in the present embodiment have openings, which pass through the attaching tool constructed as a double disk. On the side opposite to the working surface is inserted a sleeve 27, which holds sprung positioning plates as the positioning device 28. These positioning plates are two parallel sprung plates, which are fixed thereto near a lower shoulder of the sleeve 27 and in the vicinity of the working surface 23 taper towards one another in wedge-shape manner and engage on one another. The thus formed positioning device 28 is positioned with a slope such that its tip can pass between two turns 18 of a heating resistor. For this purpose the gap 29 formed between the two plates and which is closed on insertion is positioned in such a way that it it is located just below the working surface 23. The following method can be performed with the aid of this apparatus.

The attaching tool 21 is provided in the position shown in FIG. 3, i.e. with the working surface 23 at the top, with the heating resistor 16 prepared for insertion, in that they are inserted in the slots 24. They are fixed there by the magnets 45 held between the two disks 30,31. The lower disk 31 is made from ferromagnetic material and serves as a magnet holding disk or yoke. The sprung positioning device 28 ensures that its wedge-shape tip engages with the gap 29 between two heating coil turns 18. The uniform insertion of the heating coils in the grooves 24 could be made easier if, during insertion, the positioning device 28 is moved downwardly out of the vicinity of slot 24 by mechanically drawing back plate 31 with the sleeves 27. After insertion the positioning device 28 is then moved again into the slot area and is engaged between the turns. This can be facilitated e.g. by vibrating the attaching tool. The coil pitch and the flexibility of the heating resistors determine whether this additional measure is necessary.

Figure 4:
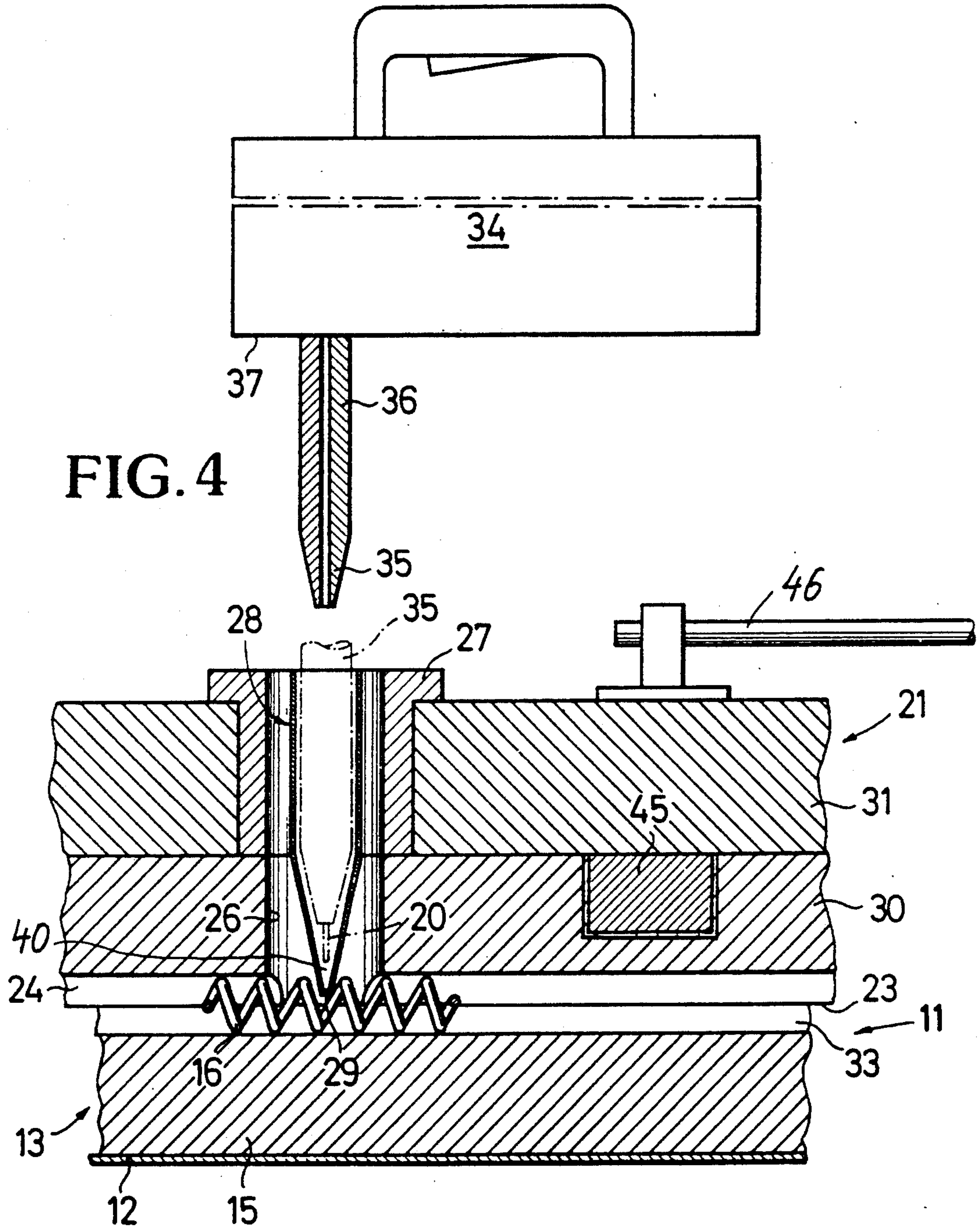
FIG. 4 a partial section through the tool according to FIG. 3 when positioned on the support.

The attaching tool 21 is then pivoted by 180° e.g. by means of the diagrammatically indicated pivoting device 46 (FIG. 4) and with the working surface 23 downwards is mounted on the surface 17 of the support 13. If the groove 24 in the attaching tool is less deep than the coil diameter, the heating coil can be simultaneously pressed into the surface 17 of the support 13, so that it automatically has a certain lateral guidance. Such a groove 33 in the support can also be provided during the compression of the support material. If the groove 24 is roughly a deep as the coil diameter, then the heating resistor is placed on the surface 17.

A clip setting device having a conventional construction is then inserted with its firing channel 35, located in the vicinity of a nose 36, in the positioning device 28, i.e. between the spring plates. The nose 36 has a wedge-shaped end corresponding to said plates and passes through the opening 26. When the fitting device is operated, the slot 29 opens somewhat and a U-shaped clip 20 is driven through the firing channel 35 and the guide channel 40 between the spring plates of the positioning device 28 into the support 13. The transverse positioning and also vertical positioning of the nose 36 is determined by the engagement in the clip guidance means 25. For example the face 37 at the base of the nose 36 can engage on sleeve 27 in the case of correct positioning. It is also possible e.g. by a cooperating profiling on the fitting device and the attaching tool to so determine the orientation of the fitting device that the clip 20 is fitted with the correct inclination corresponding to the coil pitch (FIG. 2).

Thus, if the clip fitting device 34 is moved about and operated manually, as opposed to robotic manipulation, this can take place with much less care, but faster and with greater accuracy than without the attaching tool 21, because it is merely necessary to ensure that the nose 36 is introduced into the positioning device 28, everything else taking place automatically.

However, it is also possible to guide the clip fitting device 34 by an industrial robot or any other mechanical mechanism. Therefore the number of clip guidance means 25 corresponds to the desired number of clips in the radiant heater and these are successively dealt with by the fitting device 34. When this has taken place, the attaching tool is raised again and the heating resistor, which is now held by the clips which have penetrated the support is removed from the slots. The ferromagnetic disk 31 to which the magnets adhere is firstly raised, so that the magnetic force acting on the heating resistor is reduced or removed.

Figure 5:
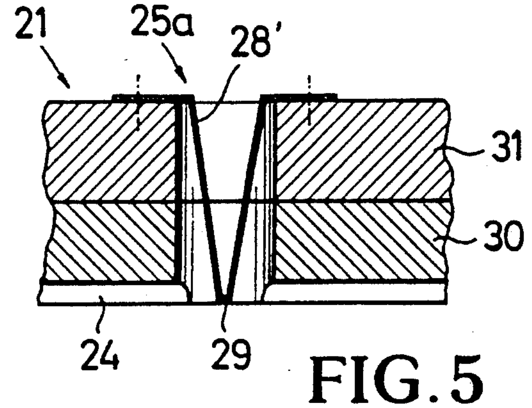
FIG. 5 a variant of clip guidance means.

FIG. 5 shows a particularly simple construction, where the clip guidance means in each case merely comprise a bore in the attaching tool 21 and a positioning device 28', which comprises two spring plates, which are fixed to the surface of the tool 21 facing the working surface 23 and pass in V-shaped manner towards one another in the vicinity of the opening 26.

FIG. 6 shows a construction in which the clip guidance means **25*b* in a sleeve 27*b* contains part of the fitting device firing channel. On the bottom of the sleeve are once again provided positioning devices 28 in the form of two spring plates passing towards one another and resiliently pressed against one another. In this case, the fitting device 34 has a shortened firing channel 35*a* and the driver 37 thereof, i.e. the tool which moves the clip downwards in the firing channel 35*a*; penetrates the extended firing channel 35*b* in the sleeve 27*b*; and drives the clip 20 into its end position. It must be ensured here that the firing channels 35*a* in the clip fitting device and 35*b* in the sleeve are aligned with one another, e.g. by using not shown centering means between the fitting device 34 and the sleeve 27*b***.

This construction would also be suitable for use of fixed fitting devices on the attaching tool and in place of the sleeve **27*b*** the fitting device nose could extend in to the end position. This construction is very advantageous for economic mass production of heating units using a small number of clips.

FIG. 7 shows the firing channel **35*b* with the insertion slopes. This construction is very advantageous for the automatic guidance of the fitting device, because the guidance of the latter by a robot 48 (FIG. 6**) only has to take place in one plane and the nose need not be introduced in to the attaching tool.

I claim:

1. Method for fixing at least one heating resistor to a support, made from heat resistant insulating material, by means of clips driven in to the support by means of a mechanical clip fitting device comprising the steps of:

detachably fitting the heating resistor to the heating resistor guidance means of an attaching tool in a desired configuration, positioning the heating resistor together with the attaching tool relative to a surface of the support, fitting the clips to the support and then removing the attaching tool from the support, the heating resistor also being removed from the attaching tool.

2. Method according to claim 1, wherein a clip guidance means is provided along the heating resistor guidance means in the attaching tool.

3. Method according to claim 2, wherein the clip guidance means are made resilient for the passage of the clips.

4. Method according to claim 2, wherein following the fitting of the heating resistor the clip guidance means are movable between the heating coils.

5. Method according to claim 2, wherein at least one clip fitting device is moved to the clip guidance means of the attaching tool and at least one clip is introduced into the support through the clip guidance means.

6. Method according to claim 1, wherein the clips in each case engage over a heating resistor turn on the portion of the turn engaging on the support.

7. Method according to claims 1 or 2, wherein the detachable fitting of the heating resistor is at least assisted by means of a magnetic force.

8. Method according to claim 7, wherein the magnetic force is variable during the performance of the method.

9. Method according to claim 1, wherein the heating resistor is detachably fitted in guidance means formed by grooves of the attaching tool.

10. Method according to claim 9, wherein clip guidance means are provided in said guidance means.

11. Method according to claim 1, wherein the support is made from a microporous silicic acid-aerogel.

12. Method according to claim 1, wherein the clip fitting device is guided by an automatic industrial robot.

13. Apparatus for fixing at least one heating resistor to a support made from heat resistant insulating material by means of clips driven into the support by a mechanical clip fitting device, comprising an attaching tool for positioning the clip relative to the heating resistor, the attaching tool having heating resistor guidance means in the form of grooves for the detachable fitting of the heating resistor in its desired configuration to said tool.

14. Apparatus according to claims 13, wherein the attaching tool has a plurality of clip guidance means which guide the clips to be driven in.

15. Apparatus according to claim 13, wherein the clip guidance means have a resilient positioning device for the passage of the clips and defining a guidance channel for the clips.

16. Apparatus according to claim 13, wherein the clip guidance means are constructed for receiving, guiding and positioning a part of the clip fitting device (34).

17. Apparatus according to claim 11, wherein the clip guidance means form a portion of a firing channel through which the clips are moved by a drive of the clip fitting device.

18. Apparatus according to claim 13, wherein magnetic components act in the vicinity of the heating resistor guidance means and the magnetic force thereof is variable.

* * * * *